Aug. 13, 1957     J. G. INGRES     2,802,455
BOOSTER BRAKE MECHANISM
Filed March 11, 1954     2 Sheets-Sheet 2
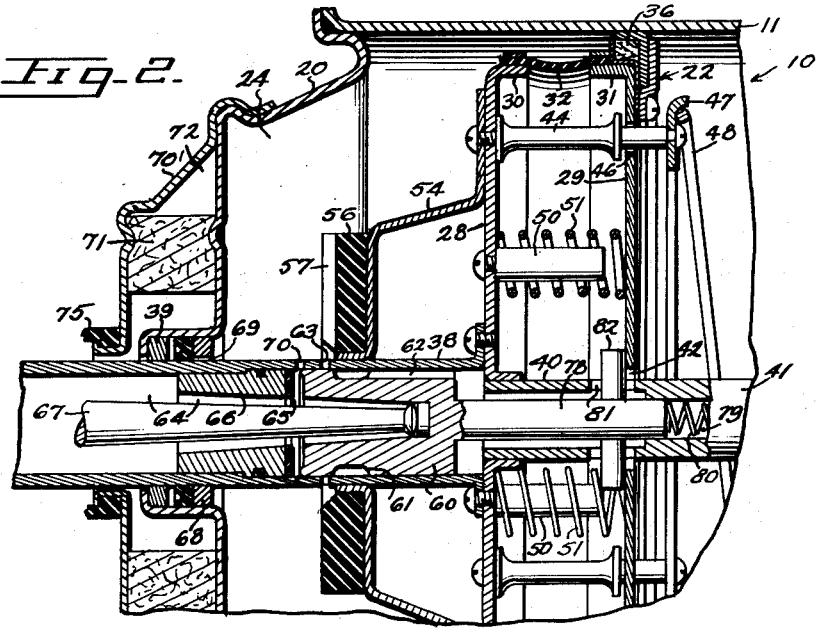
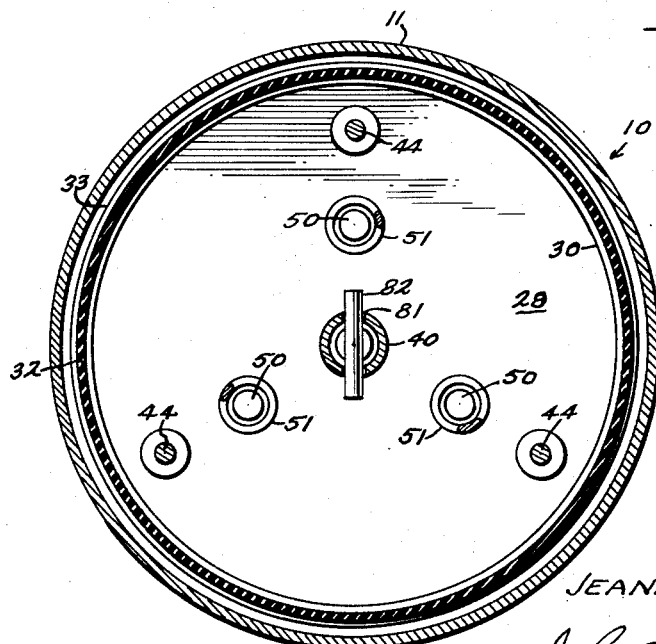
INVENTOR
JEANNOT G. INGRES
BY John F. Phillips
ATTORNEY

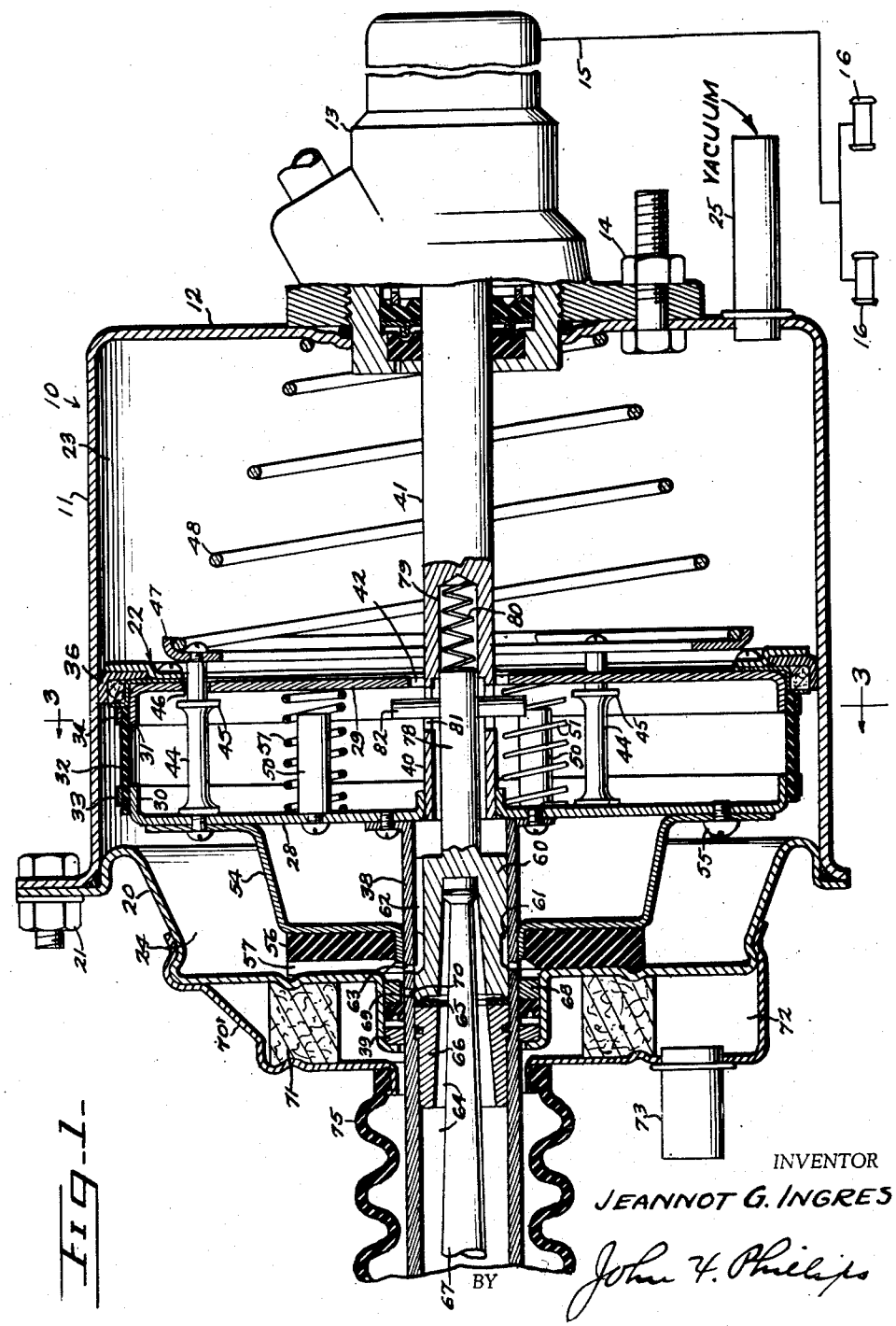

United States Patent Office

2,802,455
Patented Aug. 13, 1957

2,802,455

BOOSTER BRAKE MECHANISM

Jeannot G. Ingres, Dearborn, Mich., assignor to Kelsey-Hayes Company, a corporation of Delaware Application March 11, 1954, Serial No. 415,613

16 Claims. (Cl. 121—41)

This invention relates to booster brake mechanisms.

In prior types of booster brake mechanisms, a fluid pressure motor has been interposed between the brake connections and the master cylinder and has been controlled by a valve mechanism operated by the pedal connections. Such prior mechanisms included types wherein the fluid displacing means for the master cylinder included a booster motor operated sleeve and a plunger therein operated by the brake pedal. When the pedal was depressed to operate the valve mechanism, the fluid displacing plunger would be moved against the resistance of fluid in the master cylinder. This provided the pedal with a false initial "feel."

In accordance with later developments, the fluid displacing plunger was eliminated and the valve for controlling the motor was movable from a normal off position solely against the tension of a relatively light spring to eliminate the initial false "feel" in the brake pedal, and lost motion was provided between the valve or some element connected thereto and the fluid displacing plunger whereby, in later stages of brake application, such play would be taken up and the pedal pressure would assist the booster motor in generating braking pressures.

Such a mechanism constituted a definite improvement over earlier types. However, tension against the spring which opposed movement of the valve from its normal off position would be reduced upon initial energization of the motor which caused the pressure responsive unit of the motor to move, accordingly imparting to the operator's foot the feeling that the pedal was "falling away." Accordingly, there would be present the initial light resistance of the spring to provide a "soft" pedal, followed by a substantial drop in resistance to movement of the brake pedal, and thereafter, there would be delivered to the brake pedal progressively increasing reactions caused by increased master cylinder pressures.

The decrease in pedal resistance at the intermediate stage referred to is undesirable, since obviously it is much preferred that the pedal be relatively easily movable from off position and that resistances to pedal operation smoothly and progressively increase. This result has been accomplished in later constructions by supplementing the resistance of the spring which biases the valve to normal off position by providing a diaphragm substantially perpendicular to the axis of the motor and subject to differential motor pressures to progressively oppose movement of the brake pedal away from its normal off position starting immediately upon initial energization of the motor. Such a device provides a smooth transition between initial movement of the brake pedal from off position and the stage of brake operation in which hydraulic master cylinder pressures are caused to react against the pedal.

An important object of the present invention is to provide an improved type of booster brake mechanism wherein a pressure responsive device reacts against the booster motor valve to oppose movement thereof in the intermediate stage between initial movement of the brake pedal from its normal off position and the stage in which hydraulic master cylinder pressures oppose brake pedal movement, such pressure responsive means and associated elements being highly simplified over prior constructions.

A further object is to provide such an apparatus wherein the means responsive to differential pressures in the motor for opposing movement of the brake pedal is in the form of a highly simplified cylindrical member connected between two axially movable members comprising the pressure responsive unit of the booster motor.

A further object is to provide an apparatus of the character referred to wherein the means for reacting against the brake pedal in accordance with energization of the motor performs its operation without the necessity for using motion-transmitting levers or similar devices, thus greatly simplifying the construction.

Other objects and advantages of the invention will become apparent during the course of the following description.

In the drawings I have shown one embodiment of the invention. In this showing:

Figure 1 is an axial sectional view through a booster motor and associated elements, parts being broken away and parts being shown in elevation, the elements of the apparatus being shown in their normal off positions, Figure 2 is a fragmentary sectional view through a portion of the motor showing the parts in the positions they will occupy when partial application of the brakes has been effected, and Figure 3 is a section on line 3—3 of Figure 1.

Referring to Figure 1, the numeral 10 designates a booster motor as a whole shown in the present instance as being of the vacuum suspended type, as will become apparent. The motor comprises a cylinder 11 having a preferably integral head 12 at one end to which is secured a master cylinder 13 bolted to the head 12 as at 14. The master cylinder is provided with an outlet (not shown) connected by piping 15 to the usual brake cylinders, two of which have been diagrammatically shown in Figure 1 and indicated by the number 16.

The other end of the motor 10 is provided with a head 20 bolted thereto as at 21. Within the cylinder 11 is arranged a pressure responsive unit indicated as a whole by the numeral 22 and dividing the motor to form a constant pressure chamber 23 and a variable pressure chamber 24. The chamber 23 is adapted for connection with a suitable source of vacuum, such as the intake manifold, through a duct, not shown, connected at one end to a nipple 25 communicating with the interior of the motor chamber 23.

The pressure responsive unit comprises a pair of plates 28 and 29 spaced from each other as shown in Figures 1 and 2 and provided around their peripheries with flanges 30 and 31, respectively, surrounded by a cylindrical diaphragm or pressure responsive element 32 formed of resilient material and suitably fixed in position by clamping rings 33 and 34 surrounding the respective flanges 30 and 31. The plate 29 is suitably constructed to support a packing cup 36 slidable in the cylinder 11.

A sleeve 38 is slidable in suitable bearing and sealing means 39 carried by the head 20 and the plate 28 is secured to the sleeve 38. The plate 28 surrounds and is suitably welded or otherwise secured to a reduced sleeve portion 40 of a force delivering member in the form of a fluid displacing plunger 41 extending into the master cylinder 13 to displace fluid therefrom, as will become apparent. The plate 29 is free of the plunger 41, as shown in Figures 1 and 2, there being an axial opening 42 therein larger than the plunger 41.

The plate 28 carries a plurality of longitudinally extending studs 44, preferably three of such studs being employed and arranged 120 degrees apart as shown in Figure 3. At points normally spaced from the plate 29, each stud 44 is provided with a flange 45 to limit movement of the plate 29 toward the left in Figures 1 and 2 as will be apparent. The studs 44 project loosely through openings 46 in the plate 29 and at their free ends they carry an annular spring seat 47 engaged by one end of a conventional return spring 48, the other end of which seats against the cylinder head 12.

Inwardly of the studs 44, the plate 28 is provided with a second set of studs 50 around each of which is arranged a spring 51 engaging at its ends against the plates 28 and 29 to tend to urge them away from each other. These springs are not essential, but their use is preferred; and movement of the plates 28 and 29 away from each other is limited by the diaphragm 32.

A cap member 54 is secured to the plate 28 as at 55 and carries preferably bonded thereto a rubber bumper 56 engageable with the adjacent wall of the cylinder head 20 to limit movement of the pressure responsive unit 22 to the normal off position shown in Figure 1. The bumper 56 is provided with a radial groove 57 for a purpose to be described.

A valve 60 of the spool type is slidable in the sleeve 38. This valve is provided with an annular groove 61 communicating with the space adjacent the right-hand end of the valve 60, as viewed in Figures 1 and 2, through a longitudinal groove 62. The groove 61, in the off positions of the parts, communicates with the motor chamber 24 through a port 63, in which case, pressures will be balanced in the motor chambers 23 and 24 as further described below.

The left-hand end of the valve 60 in Figures 1 and 2 engages against a resilient seat 65 carried by one end of a stop sleeve 66 arranged in the sleeve 38. A rod 67 operable in any suitable manner by the brake pedal projects axially through the sleeve 66 and into the valve 60 to move the valve to the right when the brake pedal is operated.

The spaces 64 within the sleeves 38 and 66 are open to the atmosphere as described below. The bearing and sealing means 39 includes at the inner end thereof a bearing element 68 having an inner restricted longitudinal groove 69 communicating with the motor chamber 24. This restricted groove also communicates with a port 70 extending through the sleeve 38 and arranged within the longitudinal limits of the bearing element 68 when the parts are in the off positions shown in Figure 1. Accordingly, when the valve 60 is initially moved from its off position shown in Figure 1, the groove 69 restricts the flow of air from spaces 64 into the motor chamber 24, for a purpose to be described.

A cap 70' is carried by the head 20 and within this cap is arranged an air cleaner 71. The space 72 (Figure 1) radially outwardly of the air cleaner is open to the atmosphere through a nipple 73. The inner periphery of the cap 70 is of larger diameter than the sleeve 38 and carries the inner end of a boot 75, the outer end of this boot being connected to the rod 67 beyond the extremity of the sleeve 38 in accordance with what is now standard practice, and accordingly it will be apparent that the spaces 64 are always in communication with the atmosphere.

The valve 60 is provided with an axial extension 78 extending loosely through the reduced sleeve portion 40 and extending into an axial recess 79 in the plunger 41. In such recess is arranged a spring 80 engaging the extension 78 to bias the valve 60 to its normal off position. The extended sleeve portion 40 is provided with diametrically opposite longitudinally elongated slots 81 through which extend the ends of a pin 82 carried by and projecting through the extension 78. The ends of this pin are engageable with the plate 29 in a manner to be described but are spaced therefrom when the parts are in the off position shown in Figure 1.

*Operation*

The parts normally occupy the positions shown in Figure 1, the valve 60 engaging the seat 65, thus cutting off the admission of air into the motor chamber 24. This chamber will be in communication with the motor chamber 23 through port 63, groove 61, groove 62, the interior of the reduced sleeve portion 40, thence through slots 81 into the space between the plates 28 and 29, and the opening 42. Assuming that vacuum is present in the source to which the nipple 25 is connected, the motor will be vacuum suspended. The valve 60 is biased to the closed position shown in Figure 1 solely by the spring 80, there being lost motion between the pin 82 and plate 29. Assuming that the springs 51 are used, the diaphragm 32 will be cylindrical in form and extended to its full length longitudinally of the motor.

When the brake is to be operated, the pedal (not shown) will be depressed to move the rod 67 toward the right in Figure 1. This movement will be imparted to the valve 60 solely against the resistance of the relatively light spring 80, thus providing a "soft" pedal. Movement of the valve 60 closes the port 63 to the valve groove 61 and opens the port 70 to the atmospheric spaces 64. Air will flow through port 70, through the restricted groove 69 into the motor chamber 24. The restricted groove 69 prevents such a rapid rush of air into the chamber 24 as would tend to cause the pressure responsive unit 22 to "jump" away from its normal position.

The operation referred to establishes differential pressures in the motor 10 by admission of air into the motor chamber 24, and the unit 22 will start to move to the right. The plate 28 will effect direct movement of the plunger 41 into the master cylinder to displace fluid therefrom. It will be apparent that pressures on opposite sides of the plate 29 will always be balanced. However, differential pressures will affect the packing cup elements 36 to tend to cause the plate 29 to move in fixed spaced relation to the plate 28. However, a substantially greater surface of the diaphragm 32 will be exposed to the higher pressure in the chamber 24, and accordingly the diaphragm 32 buckles radially inwardly as shown in Figure 2. This operation effects a movement of the plate 29 toward the left relative to the plate 28 and engages the plate 29 with the pin 82. The forces tending to move the plate 29 toward the left will be proportional to differential pressures in the motor chambers 23 and 24, and under the conditions referred to a force will be transmitted from the plate 29 through pin 82, axial extension 78, valve 60 and rod 67, and thus to the brake pedal.

Initial resistance to movement of the brake pedal will be provided solely by the spring 80 and upon movement of the pressure responsive unit, the plunger 41 moves to the right tending to release tension of the spring 80. In the absence of the diaphragm 32 and associated elements, this stage of pedal operation would be accompanied by a feeling of the "falling away" of the brake pedal. However, movement of the plunger 41 can occur, in normal operation when vacuum is present, solely by energization of the motor and the latter operation is instantly accompanied by a radial contraction of the diaphragm 32 and movement of the plate 29 toward the left into engagement with the pin 82. Accordingly, there will be no period of "dropping off" of the brake pedal. Moreover, the supplemental resistance to movement of the brake pedal provided by the diaphragm 32 progressively increases as motor energization increases, thus providing a smooth progressive increase in resistance to movement of the brake pedal.

A point will be reached in which atmospheric pressure will be established in the motor chamber 24 and the motor will be energized to its maximum extent. This will occur prior to maximum brake application. This point of maximum motor energization is known as the point of power "run-out" and with the present construction, the operator is enabled to transmit direct force to the plunger 41 to assist the motor in displacing fluid from the master cylinder into the brake cylinders 16. Under such conditions, the pin 82 will move to the right relative to the plunger 41, carrying with it the plate 29 to extend the elastic diaphragm 32 to the limit of its length longitudinally of the motor. At the same time, the pin 82 will engage the right-hand limits of the slots 81, thus transmitting force directly from the axial extension 78 and pin 82 to the plunger 41 to supplement the power of the motor. Thus the operator is enabled to provide for maximum brake application and throughout the range of movement of the brake pedal, the operator will encounter initially slight resistance followed by progressively increasing resistances up to the point of maximum brake application.

The structure of the present device provides a highly simplified type of means for restricting movement of the brake pedal in that stage of operation between the encountering of the initial resistance of the spring 80 and the point of power "run-out."

In Figure 2, the parts have been shown in the positions they will occupy just prior to the point of power "run-out" wherein radial contraction of the diaphragm 32 is causing the plate 29 to bear against the pin 82 to resist movement of the brake pedal. The pin 82 is arranged only slightly to the left of the right-hand limits of the slots 81 and it is this slight play which is taken up at the point of power "run-out" to transmit direct force from the pedal through the valve, etc., to the fluid displacing plunger 41. The parts of the apparatus are quite simple and economical to manufacture and also easy to assemble, and the simplicity of the parts provides for long and trouble-free operation.

It is to be understood that the form of the invention shown and described is to be taken as a preferred example of the same, the invention being defined in the appended claims.

I claim:

1. A motor mechanism comprising a motor casing, a pressure movable unit in said motor casing dividing it to form a pair of chambers, and having a force delivering member connected thereto, a valve connected for controlling said motor, said valve having a normal position balancing pressures in said motor and being movable in one direction from said position to connect one of said chambers to a source of pressure to move said pressure movable unit, spring means biasing said valve to said normal position, and a pressure responsive device comprising a diaphragm encircling said pressure movable unit and having opposite sides subject to pressures in said motor chambers whereby, when differential pressures are present in said motor chambers, said diaphragm will be radially deformed, said pressure movable unit having a portion operative upon deformation of said diaphragm for opposing movement of said valve in said direction.

2. A motor mechanism in accordance with claim 1 wherein said valve is provided with means having lost motion connection with said force delivering member to provide for movement of said valve from said normal position free of said force delivering member and which lost motion is taken up upon predetermined movement of said valve whereby force applied to said valve to move it in said direction will be directly transmitted to said force delivering member.

3. A motor mechanism comprising a motor casing, a pressure movable unit in said motor casing dividing it to form a pair of chambers and having a force delivering member connected thereto, a valve connected for controlling said motor, said valve having a normal position balancing pressures in said motor and being movable in one direction from said position to connect one of said chambers to a source of pressure to move said pressure movable unit, spring means biasing said valve to said normal position, said pressure movable unit comprising a plate co-axial with said motor and movable axially thereof relative to said force delivering member, and a diaphragm encircling said plate and another part of said pressure movable unit and subject radially inwardly and outwardly thereof to pressures in said chambers whereby, when differential pressures are present in said chambers, said diaphragm will be radially deformed and said plate will be moved axially of said force delivering member, and force transmitting means carried by said valve and engageable with said plate upon such axial movement thereof for opposing movement of said valve in said direction.

4. A motor mechanism in accordance with claim 3 provided with lost motion between said force delivering member and said force-transmitting means to provide for movement of said valve from said normal position free of said force delivering member and whereby said lost motion will be taken up upon predetermined movement of said valve in said direction for the direct transmission to said force delivering member of forces applied to said valve to move it in said direction.

5. A motor mechanism comprising a motor casing, a pressure movable unit in said motor dividing it to form a pair of chambers, said unit comprising a pair of members co-axial with said motor casing and spaced from each other axially thereof, an annular diaphragm surrounding and secured to said members, the outer face of said diaphragm being subject to pressures in one of said chambers and the inner face of said diaphragm being subject to pressures in the other of said chambers, a force delivering member carried by one member of said pair and movable thereby, a valve having a normal position in which it is connected to balance pressures in said chamber and being movable in one direction from such position to connect said one motor chamber to a source of fluid pressure to actuate said pressure movable unit, said diaphragm being responsive to differential pressures in said chambers to be radially contracted when said motor is energized and effect movement of the members of said pair toward each other, and force-transmitting means for utilizing such movement of the members of said pair toward each other for opposing movement of said valve in said direction.

6. A motor mechanism according to claim 5 provided with resilient means opposing movement of said valve from said normal position, said force-transmitting means having lost motion connection with said force delivering member to limit movement of said valve in said direction whereby, upon predetermined energization of said motor, said lost motion will be taken up for the transmission to said force delivering member of forces applied to said valve to move it in said direction.

7. A motor mechanism according to claim 5 provided with resilient means interposed between the members of said pair to urge them away from each other to predetermine the differential motor pressures affecting said diaphragm necessary for moving the members of said pair relatively toward each other.

8. A motor mechanism comprising a motor casing, a pressure movable unit in said motor dividing it to form a constant pressure chamber and a variable pressure chamber, said pressure movable unit comprising a pair of axially spaced members co-axial with said motor casing, a force delivering member connected to the member of said pair adjacent said variable pressure chamber, means sealing the other member of said pair relative to said casing with the space between the members of said pair communicating with said constant pressure chamber, an annular diaphragm surrounding and secured to said members, said diaphragm having its outer face subject to pressures in said variable pressure chamber and having its inner face open to the space between said members whereby, when differential pressures are present in said chambers, said diaphragm will be contracted radially, a valve having a normal position in which it is connected to balance pressures in said chamber and being movable in one direction from such position for connecting said variable pressure chamber to a source of pressure, said other member of said pair being free of said plunger to move axially toward said one member of said pair when said diaphragm is radially contracted, and force-transmitting means engaging said other member of said pair to transmit to said valve forces opposing movement of the latter in said direction.

9. A motor mechanism according to claim 8 wherein said force-transmitting means comprises a stem carried by said valve and a cross pin carried by said stem, said force delivering member having a sleeve portion in which said stem is arranged and said sleeve portion having a longitudinal slot in which said pin is slidable relative to said sleeve portion, said pin being arranged adjacent and in the path of movement of said other member of said pair to be engaged thereby.

10. A motor mechanism according to claim 8 provided with means connected to bias the members of said pair away from each other to predetermine the differential pressures in said chambers at which said diaphragm becomes effective for moving said other member of said pair to oppose movement of said valve.

11. A motor mechanism according to claim 8 wherein said force delivering member is provided with a sleeve portion having diametrically opposite axially elongated slots, said force-transmitting means comprising a stem carried by said valve and projecting into said sleeve portion, and a transverse pin carried by said stem and operating in said slots, said pin being normally spaced from said other member of said pair to provide for relatively free movement of said valve in said direction to energize said motor, and spring means connected to bias the members of said pair away from each other to predetermine the differential pressures in said motor chambers at which said diaphragm becomes effective for moving said other member of said pair into engagement with said pin.

12. A motor mechanism comprising a motor casing, a pressure movable unit in said casing dividing it to form a variable pressure chamber and a constant pressure chamber, said unit comprising a pair of axially spaced members co-axial with said casing, one of such members facing said variable pressure chamber and the other of said members facing said constant pressure chamber, means carried by said other member and movable relative to said casing in pressure-sealing relation thereto, circumferentially spaced stems carried by said one member, said other member having openings through which said stems loosely project into said constant pressure chamber, a spring seat carried by said stems in said constant pressure chamber, a return spring in said constant pressure chamber engaging said seat, a cylindrical diaphragm surrounding and connected to said members, a force delivering member carried by said one member and projecting loosely through said other member, a valve having a normal position connecting said motor chambers and from which it is movable to disconnect said motor chambers and connect said variable pressure chamber to a source of pressure, the outer face of said diaphragm being open to pressure in said variable pressure chamber and the inner face of said diaphragm being open to pressure in said constant pressure chamber whereby said diaphragm is radially contractible when differential pressures are present in said chambers, said other member being movable toward said one member under the influence of such contraction of said diaphragm, and force-transmitting means for utilizing such movement of said other member for opposing movement of said valve in said direction.

13. A motor mechanism according to claim 12 wherein said force delivering member is provided with a sleeve portion having diametrically opposite axially elongated slots, said force-transmitting means comprising a stem carried by said valve and projecting into said sleeve portion, and a transverse pin carried by said stem and projecting through said slots, said pin, in said normal position of said valve, being spaced from said other member to provide for movement of said valve in said direction to energize said motor.

14. A motor mechanism according to claim 12 wherein said force delivering member is provided with a sleeve portion having diametrically opposite axially elongated slots, said force-transmitting means comprising a stem carried by said valve and projecting into said sleeve portion, and a transverse pin carried by said stem and projecting through said slots, said pin, in said normal position of said valve, being spaced from said other member to provide for movement of said valve in said direction to energize said motor, said pin being normally spaced from an end of said slots in said direction of movement of said valve to limit movement of said pin relative to said force delivering member whereby, after predetermined movement of said valve, forces moving said valve in said direction will be applied to said force delivering member.

15. A motor mechanism according to claim 12 provided with spring means connected to bias the members of said pair away from each other to predetermine the differential pressures affecting said diaphragm at which said other member becomes effective for opposing said movement of said valve.

16. A motor mechanism according to claim 12 provided with spring means connected to bias the members of said pair away from each other, said force delivering member having a sleeve portion provided with diametrically opposite axially elongated slots, said force-transmitting means comprising a stem carried by said valve and projecting into said sleeve portion, and a transverse pin carried by said stem and operable in said slots, said pin being normally spaced from said other member to provide movement of said stem free of said other member for said movement of said valve to connect said variable pressure chamber to said source.

References Cited in the file of this patent
UNITED STATES PATENTS

| | | |
|---|---|---|
| 2,395,223 | Ingres | Feb. 19, 1946 |
| 2,457,721 | Price | Dec. 28, 1948 |